Feb. 10, 1959  W. R. POLANIN  2,873,004
ROTOR BRAKE
Filed Feb. 13, 1956  2 Sheets-Sheet 1

INVENTOR.
Walter R. Polanin
BY Walter L. Schlegel, Jr.
Atty.

Witness:
Chas H. Barnes

Feb. 10, 1959    W. R. POLANIN    2,873,004
ROTOR BRAKE
Filed Feb. 13, 1956    2 Sheets-Sheet 2
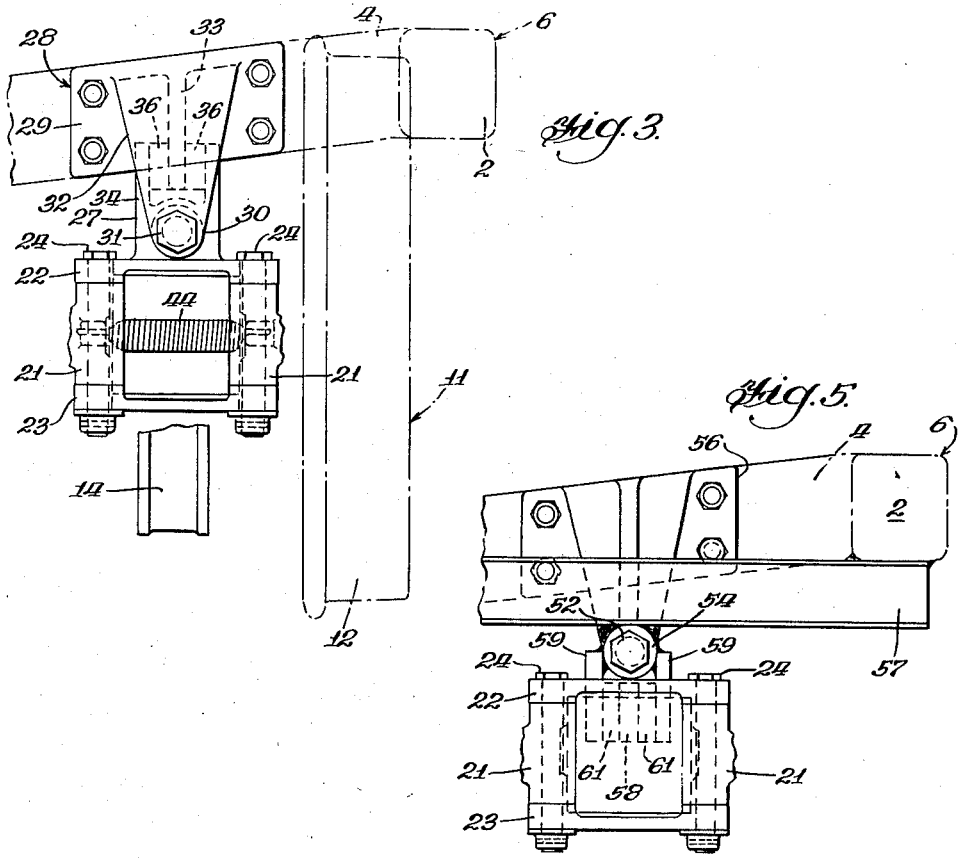
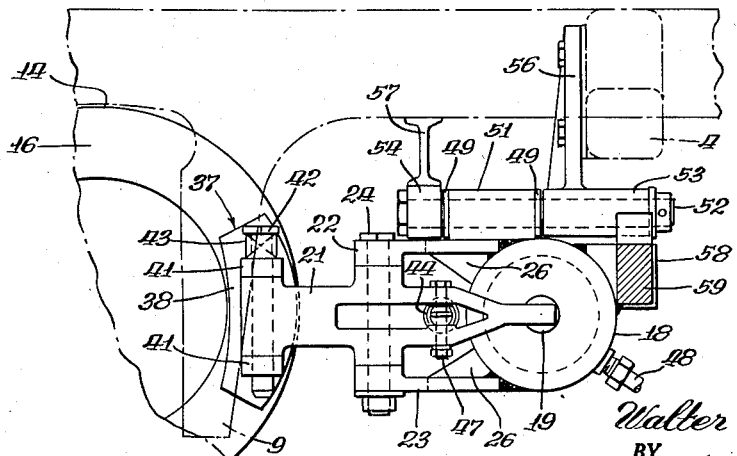
INVENTOR.
Walter R. Polanin
BY Walter S. Schlegel, Jr.
Atty.
Witness:
Chas H. Barrow

United States Patent Office 2,873,004
Patented Feb. 10, 1959

2,873,004

ROTOR BRAKE

Walter R. Polanin, Chicago, Ill., assignor to American Steel Foundries, Chicago, Ill., a corporation of New Jersey Application February 13, 1956, Serial No. 564,995

1 Claim. (Cl. 188—59)

This invention relates to brake equipment for railway car trucks and more particularly to an off-wheel brake arrangement in which stator means are provided on the truck frame to frictionally engage and decelerate disk type rotors provided on and rotatable with wheel and axle assemblies.

The off-wheel brake arrangement is particularly adapted for use on conventional four-wheel, light-weight, high speed passenger car trucks comprising a one-piece truck frame resiliently supported on equalizers which, in turn, are supported at their ends on journal boxes provided for the wheel and axle assemblies. The truck frame is shown as comprising side rails interconnected by end rails and spaced transoms located adjacent their respective wheel and axle assemblies to support one or more stator units each provided with brake shoes to frictionally engage opposite sides of its respective rotor. As the truck frame is resiliently supported on springs provided on the equalizers, it is tiltable relative to the wheel and axle assemblies. To prevent stressing or breakage of parts of the brake arrangement during such tilting movement of the truck frame and also to insure at all times a full flush face engagement of the brake shoes with the rotor, it is an object of the invention to provide a brake arrangement in which the stator assembly is supported on the truck frame for pivotal movement transversely of the truck.

Another object of the invention resides in the provision of a rotor brake arrangement in which the stator assembly is pivotally suspended from a mounting bracket integral with or secured to the transom of the truck frame.

A further object of the invention resides in the provision of resilient means interposed between the mounting bracket and the stator assembly to yieldably resist relative pivotal movement therebetween, said resilient means serving to return the stator assembly from a tilted position to its normal position below the mounting bracket upon disengagement of the brake shoes with the rotor.

Another object of the invention resides in the provision of an off-wheel brake arrangement in which means are provided for adjusting the position of the stator assembly radially of the rotor to insure full face engagement of the brake shoes with opposite sides of the rotor.

Another object of the invention resides in the provision of an off-wheel brake arrangement which is relatively simple and inexpensive in construction and reliable in operation.

Another object of the invention resides in the provision of an off-wheel brake arrangement in which the several parts thereof are readily accessible for inspection and replacement of worn out parts.

The invention embodies other novel features, details of construction and arrangement of parts which are hereinafter set forth in the specification and claim and illustrated in the accompanying drawings, wherein:

Figure 3 is an end elevational view of same, the outer ends of the brake levers and their respective brake head-shoe assemblies being omitted to more clearly illustrate the invention;

Figure 4 is a fragmentary side elevational view, corresponding to Figure 2, illustrating a modified form of the invention; and Figure 5 is a fragmentary end elevational view of same.

Figure 1:
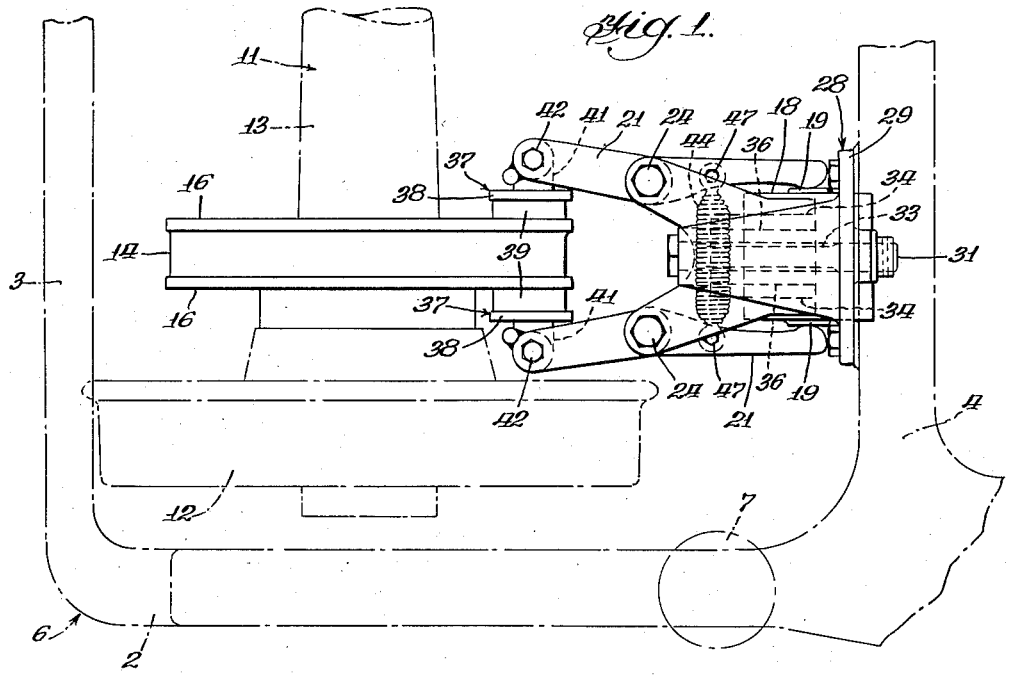
Figure 1 is a top plan view illustrating a railway car truck provided with a rotor brake arrangement embodying features of the invention, only one quarter of the truck being shown as it is symmetrical about its longitudinal and transverse center lines.
Figure 2:
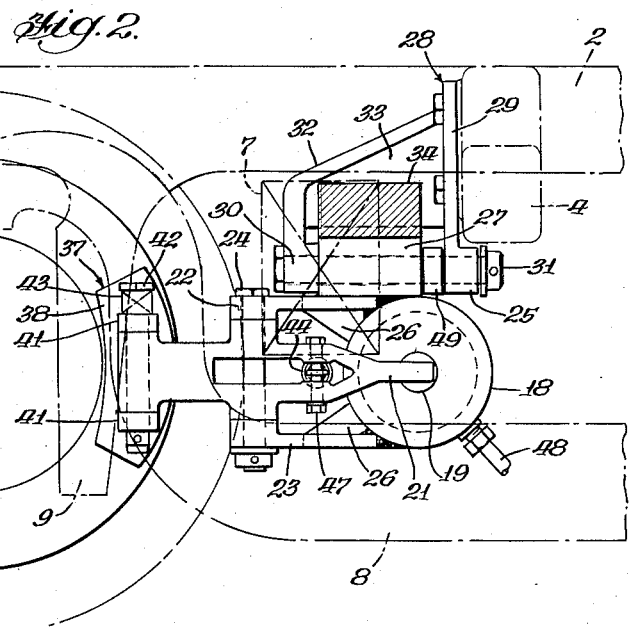
Figure 2 is a side elevational view of same.

Referring now to the drawings for a better understanding of the invention and more particularly to Figures 1 to 3 therein, the off-wheel brake arrangement is shown as applied to a four-wheel railway car truck embodying a one-piece truck frame 6 having side rails 2—2 interconnected by end rails 3—3 and transoms 4—4. The frame is resiliently supported by springs 7 seated on equalizers 8—8 which are mounted at their ends upon conventional journal boxes (not shown). The journal boxes are engaged between spaced pedestal jaws 9—9 to rotatably receive wheel and axle assemblies 11 which are shown as comprising flanged wheels 12—12 secured to axles 13. Rotor disks 14 are secured to the axles and/or wheels to rotate therewith and are provided at opposite sides thereof with parallel radial surfaces 16 to be frictionally engaged by stator means to decelerate the assemblies 11.

The stator means is shown as comprising a cylinder 18 having opposed pistons 19—19 therein to engage the inner ends of their respective brake levers 21—21. Upper and lower brake lever support plates 22 and 23 are welded to or formed integral with the cylinder 18 and are formed with vertically aligned pairs of apertures to receive pivot bolts 24—24 which extend through bearing apertures provided in the brake levers. If desired, reinforcing gussets 26—26 may be provided between the plates 22 and 23 and the cylinder 18. A pivot bearing boss 27 is formed integral with or welded to the upper plate 22 and cylinder 18 and formed with a bore having a horizontal axis normal to the common vertical plane of the bolts 24—24. A stator support bracket, indicated generally at 28, is shown as comprising a vertical base 29 bolted to the side of the transom facing its adjacent wheel and axle assembly 11, the lower end of the base having a bearing 25 to receive one end of a pivot bolt 31.

A bearing arm 32 extends outwardly and downwardly from the base 29 and is provided at its lower end with a bearing 30 to receive the other end of the bolt 31. The bearing boss 27 is journaled on the bolt 31 between the base 29 and arm 32 for pivotal movement transversely of the truck responsive to lateral tilting of the truck frame relative to the axis of the wheel and axle assembly.

An abutment wall 33 is provided on the bracket 28 between the base 29 and the arm 32 to be straddled by spaced lugs 34—34 projecting upwardly from the bearing boss 27. To yieldably resist pivotal movement of the boss 27 relative to the bracket 28, resilient rubber pads 36—36 or the like are provided between each lug 34 and the wall 33, the pads being bonded to their respective lugs and/or to the wall, as desired.

Brake head-shoe assemblies, indicated generally at 37, are provided on the outer ends of the brake levers 21—21, each assembly being shown as comprising a brake head 38 and a brake shoe 39. Each brake head is provided with spaced apertured lugs 41—41 to straddle the outer end of its respective brake lever and to be pivotally connected thereto by a pivot element 42, one of said lugs being frictionally engaged against the lever by means of a compression spring 43 mounted on the pivot element.

Each brake shoe 39 is bonded or otherwise secured to its respective brake head and is of generally crescent shape to insure full face engagement with its respective friction surface 16 during vertical movement of the shoes relative to the rotor.

To yieldably resist pivotal movement of the brake levers and outward movement of the pistons 19—19 relative to the cylinder 18, the inner ends of the levers are interconnected by a tension spring 44. The spring 44 is formed with loop ends disposed in slots formed in the levers and secured thereto by bolts 47.

In the operation of the brake arrangement thus shown and described, pressure fluid from any suitable source is directed through a conduit 48 to the interior of the cylinder 18 between the opposed pistons 19—19 which then act to pivot their respective brake levers 21—21 to engage the brake shoes 39—39 against their respective friction surfaces 16—16 on the rotor disk 14 to decelerate the wheel and axle assembly 11. Responsive to a drop in pressure of the fluid in the cylinder, the tension spring 44 acts to return the brake levers and pistons to their normal inoperative positions.

As the truck frame 6 is resiliently supported on the wheel and axle assemblies 11, it is subject to tilting or lateral rocking motion relative to a horizontal plane through the axes of the wheel and axle assemblies when the truck is in service. To provide full face engagement between the brake shoes and their respective rotor surfaces when the frame is tilted laterally, the stator means 17 is suspended for pivotal movement transversely of the frame by means of the support bracket 28 and the pivot bolt 31. The resilient elements 36—36 are provided to yieldably resist pivotal movement of the stator means relative to the truck frame to normally maintain the brake levers in a common plane parallel to the axis of its respective wheel and axle assembly.

To adjust the position of the brake shoes radially of the rotor disk, spacing collars 49 or shims are provided on the pivot bolt 31 between the ends of the bearing boss 27 and the axially spaced bearings 25 and 30 provided on the support bracket 28.

Figures 4 and 5 in the drawings illustrate a modified form of the invention in which the stator means is provided with a pivot bearing boss 51 journaled on bolt 52 which extends horizontally longitudinally of the truck frame and is mounted at its ends in spaced bearings 53 and 54 provided on a support bracket 56 and transverse member 57, respectively. The bracket 56 is adapted to be bolted or otherwise secured to the transom 4, while the transverse member 57 is welded or otherwise secured at its ends to the slide rails 2—2.

A vertically disposed abutment wall 58 is provided on the cylinder 18 to be straddled by spaced lugs 59—59 provided on the bearing 53. Resilient rubber pads 61 are provided on opposite sides of the abutment wall for engagement by their respective lugs 59 to yieldably resist pivotal movement of the stator means relative to the truck frame, the pads being bonded to the abutment wall and/or to their respective lugs. This form of the invention is otherwise similar in construction and operation to the form heretofore described with reference to Figures 1 to 3 in the drawings.

While the invention has been shown in but two forms, it is obvious to those skilled in the art that it is not so limited but is susceptible of various changes and modifications without departing from the spirit of the invention or the scope of the claim.

I claim:

In a brake arrangement for a railway car truck having a truck frame, a supporting wheel and axle assembly, and oppositely facing rotatable brake surfaces on said assembly; the combination of: a brake unit comprising a brake frame, spaced bearings on one of the frames, another bearing on the other frame received between said spaced bearings, a pair of mutually facing abutment surfaces carried by one of the frames at opposite sides of a vertical plane approximately perpendicular to the rotational axis of said assembly and bisecting said bearings, said brake frame comprising a cylinder having top and bottom webs attached thereto and extending toward the assembly, said unit comprising brake levers between said webs and fulcrumed thereto, said unit comprising brake shoes actuated by said levers into engagement with respective surfaces, another pair of abutment surfaces on the other frame between and facing respective of said first-mentioned abutment surfaces, resilient pads between said first-mentioned abutment surfaces having faces compressed thereagainst and against said second-mentioned abutment surfaces, readily removable means extending through and pivotally interconnecting said bearings, and spacer means on said removable means between said other bearing and at least one of the first-mentioned bearings for adjustably determining the distance between said shoes and said axis, one pair of said abutment surfaces being movable with the brake frame toward and away from said axis when said spacer means are removed, at least one pair of said abutment surfaces and the engaged pad faces being substantially vertical and being slidably interengaged.

References Cited in the file of this patent

UNITED STATES PATENTS

| | | |
|---|---|---|
| 1,779,776 | Masion | Oct. 28, 1930 |
| 2,274,859 | Eksergian | Mar. 3, 1942 |
| 2,377,190 | Tack | May 29, 1945 |
| 2,410,574 | Eksergian | Nov. 5, 1946 |
| 2,531,358 | Helsten | Nov. 21, 1950 |
| 2,760,601 | Gaenssle | Aug. 28, 1956 |